(12) United States Patent
Cataldo et al.

(10) Patent No.: US 8,290,547 B2
(45) Date of Patent: Oct. 16, 2012

(54) PROTECTIVE CASE HAVING RETRACTABLE EARBUDS

(75) Inventors: John Cataldo, Westlake Village, CA (US); Daniel C. Sullivan, Santa Barbara, CA (US); Mardis Bagley, San Francisco, CA (US)

(73) Assignee: Head Logic, LLC., Westlake Village, CA (US)

( * ) Notice: Subject to any disclaimer, the term of this patent is extended or adjusted under 35 U.S.C. 154(b) by 0 days.

(21) Appl. No.: 13/348,886

(22) Filed: Jan. 12, 2012

(65) Prior Publication Data

US 2012/0225701 A1    Sep. 6, 2012

Related U.S. Application Data

(60) Provisional application No. 61/447,816, filed on Mar. 1, 2011.

(51) Int. Cl.
 *H04M 1/00* (2006.01)
(52) U.S. Cl. .................................. 455/575.1; 455/569.1
(58) Field of Classification Search ............... 455/569.1, 455/575.1, 575.4; 429/7, 163; 206/216, 206/223, 320
See application file for complete search history.

(56) References Cited

U.S. PATENT DOCUMENTS

| | | | |
|---|---|---|---|
| 6,011,686 A | 1/2000 | Grasso et al. | |
| 6,179,238 B1 | 1/2001 | Phillipps | |
| 6,633,770 B1 | 10/2003 | Gitzinger et al. | |
| 6,825,810 B2 | 11/2004 | Ragner et al. | |
| 6,845,158 B2 | 1/2005 | Koester et al. | |
| 7,032,728 B2 * | 4/2006 | Harcourt | 191/12.2 R |
| 7,077,693 B1 | 7/2006 | Symons | |
| 7,086,512 B2 * | 8/2006 | Shack et al. | 191/12.4 |
| 7,257,422 B2 * | 8/2007 | Loprete | 455/550.1 |
| D566,107 S | 4/2008 | Bowling | |
| D651,791 S * | 1/2012 | Cataldo et al. | D3/218 |
| 2002/0193151 A1 * | 12/2002 | Edreich | 455/569 |
| 2005/0255898 A1 * | 11/2005 | Huang | 455/575.8 |
| 2011/0130174 A1 * | 6/2011 | Kroupa | 455/569.1 |
| 2011/0159324 A1 * | 6/2011 | Huang et al. | 429/7 |
| 2011/0203954 A1 * | 8/2011 | Kroupa | 206/320 |
| 2011/0233078 A1 * | 9/2011 | Monaco et al. | 206/223 |

OTHER PUBLICATIONS http://www.stylishnomad.com/travel-accessories/mp3-and-mobile-accessories/push-button-retractable-earphones-bees.html?gclid=CN7o1PXU868CFasBQAodSBA9Xg.

* cited by examiner

*Primary Examiner* — Sonny Trinh
(74) *Attorney, Agent, or Firm* — Kevin H. Fortin, Esq.

(57) ABSTRACT

A case for holding an audio device having a female audio jack. The case has a removable cover including a male audio jack for electronically connecting the cover to the female audio jack of the audio device. The cartridge includes a spool and houses an ear bud cable. The ear bud cable has a first end with at least one ear bud, and a second end attached to the spool. The cartridge has a rotatable spool for selectively retracting and dispensing the ear bud cable. The spool electronically connects with the male audio jack to enable audio communication between the audio device and the ear bud. In one embodiment, the spool electronically connects with the male audio jack via a jumper wire. In another embodiment, the spool electronically connects with the male audio jack via an electrical contact pad integrated into the case.

6 Claims, 4 Drawing Sheets

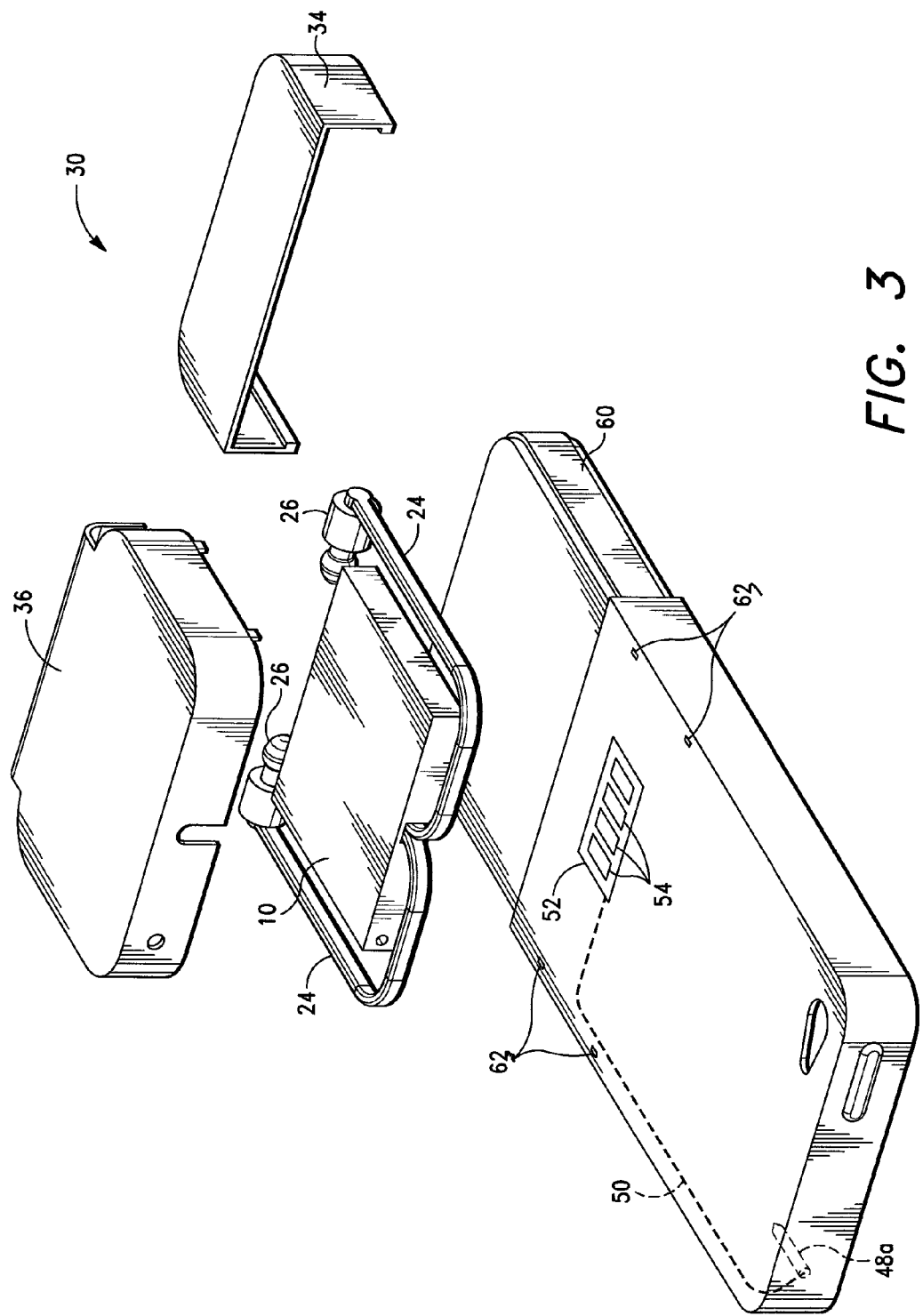

US 8,290,547 B2

PROTECTIVE CASE HAVING RETRACTABLE EARBUDS

PRIORITY

This application claims priority to U.S. Provisional Patent Application Ser. No. 61/447,816, filed 1 Mar. 2011, and U.S. Provisional Patent Application Ser. No. 61/535,629, filed 16 Sep. 2011, the disclosures of which are incorporated herein by reference.

RELATED APPLICATIONS

This application also relates in subject matter to U.S. Design Pat. No. D651,791 filed 11 Jul. 2011 and U.S. patent application Ser. No. 13/153,403, filed 4 Jun. 2011.

FIELD OF THE INVENTION

The present invention relates to audio device cases having an ear bud management mechanism for dispensing and retracting ear bud cables.

BACKGROUND OF THE INVENTION

Studies indicate a relationship between traffic safety and cellular phone use. Drivers may become distracted while operating a phone and this raises safety concerns. Holding and operating a telephone may increase safety risks for drivers.

A driver's phone typically needs to be located, handled, and visually identifiable buttons operated to make or receive a call. Most phones have a display. A user's eyes require time to focus on the display, and additional time to re-focus on the road. Each of these steps may distract a driver from safe vehicle operation.

The concept of "hands free" telephone operation has arisen and some believe that providing a simple mechanism to enable phone functionality yields improved safety. "Hands free" devices have evolved including wireless earpieces, wired headsets with a call button to answer and drop calls without touching the phone, and integrated speaker-phone systems that enable a cell phone to dock into an automotive sound system having a fixed microphone and a speaker system.

Current "hands free" systems are not without problems. Wireless earpieces, e.g. Bluetooth devices, still need to be located and activated. In a moving car, a blue-tooth earpiece can easily shift position, bounce around, and become difficult to locate. Wired headsets have wires that can tangle, and may be quite difficult to untangle while driving. Speaker-phone systems broadcast conversations to other vehicle occupants, which may irritate parties to the conversation and other vehicle occupants.

What is desired is a way of improving automotive safety for those that use cellular phones while driving. What is also desired is a better way of managing ear bud cables. What is further desired is a way of simplifying the experience of listening to music on a portable electronic device.

SUMMARY OF THE INVENTION

A case for holding an audio device, such as a telephone, having a female audio jack includes a cover having a first component and a second component that interconnect to hold the audio device. The first component includes a male audio jack for electronically connecting the case to the female audio jack of the audio device.

The case includes a cartridge attached to the cover. The cartridge has an ear bud cable and rotatable spool for selectively retracting and dispensing the ear bud cable. The ear bud cable has a first end with at least one ear bud, and a second end attached to the spool.

The spool electronically connects with the male audio jack of the cover to enable audio communication between the audio device and the at least one ear bud.

In one embodiment, the first component and the second component each include tracks for slidably engaging the audio device. The tracks assure alignment of the male audio jack with the female audio jack of the audio device.

In an alternate embodiment of the invention, the case includes a pocket integrated with the case for holding the cartridge. The pocket defines peripheral grooves to enable ear bud cables to wrap around at least a portion of the pocket so that the pocket grooves and the cartridge cooperate to store ear bud cables.

In another embodiment, the cartridge includes two ear buds and two ear bud cables to enable stereo sound. The pocket defines three sides having peripheral grooves to enable the ear bud cables to wrap around at least a portion of the pocket. A fourth side includes ear bud sockets for removeably retaining ear buds. The pocket grooves and the cartridge cooperate to store the ear bud cable both inside and outside the case. Using both the inside and outside of the case for cable storage enables a case of a minimum size to be used while optimizing the length of the cable that can be stored. Further, storing a portion of the cable both inside and outside the case enables a more robust (e.g. thicker) cable to be used while minimizing the size of the case.

Preferably, the audio device is a telephone and the male audio jack is a Tip-Ring-Ring-Sleeve (TRRS) connector to enable the cartridge to communicate stereo audio, microphone audio and control button commands between the ear bud cable and the telephone.

BRIEF DESCRIPTION OF THE DRAWINGS

FIG. 3 shows a partially exploded perspective view of a case, cartridge and audio device.

DETAILED DESCRIPTION

Figure 1:
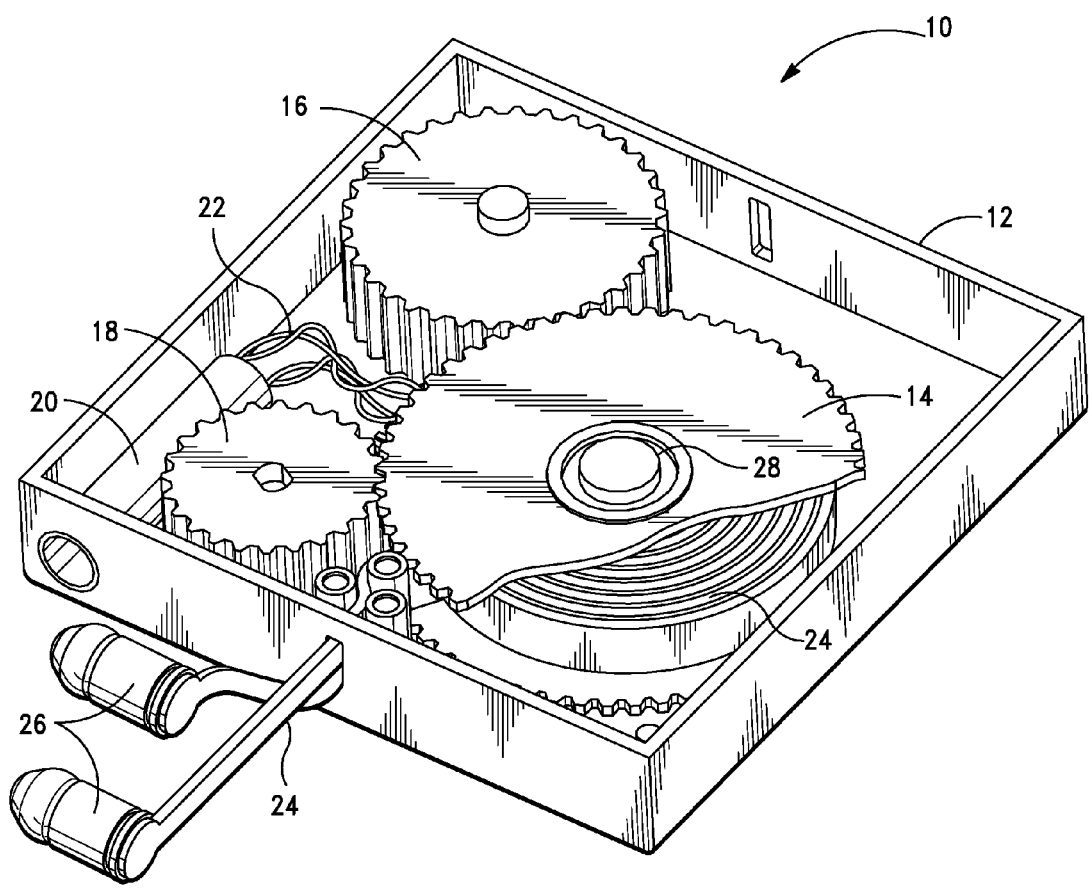
FIG. 1 shows a cut-away perspective view of a cartridge for retracting an ear bud cable in accordance with the present invention.

FIG. 1 shows an embodiment of the cartridge 10 in accordance with the present invention. The cartridge 10 includes housing 12, a spool 14, a power gear 16, a rotary damper gear 18, an input jack 20, an electrical connector 22, an ear bud cable 24, ear buds 26 and a hub 28.

The hub 28 is fixed within the housing 12. In one embodiment, the spool 14 rotatably mounts on the hub 28, establishing a rotatable electrical connection between the spool 14 and the hub 28. Accordingly, the ear bud cable 24 continuously electrically connects with the hub 28 via the spool 14 and rotation of the spool 14 dispenses and retracts the ear bud cable 24 while maintaining an electrical connection with the hub 28. The spool 14 and the hub 28 electrically connect via the electrical connector 22 to the input jack 20.

The rotary damper gear 18 is rotatably mounted within the housing 12. The rotary damper gear 18 mates in operative engagement with the spool 14 so that the rotary damper gear 18 presses against the spool 14. In particular, both the rotary damper gear 18 and the spool 14 each have a periphery. The periphery of the rotary damper gear 18 and the periphery of the spool 14 press against each other in a direction tangential to the respective peripheries, and may press against each other in a radial fashion. The rotary damper gear 18 and the spool 14 mate so that free rotation of the spool 14 is inhibited by the rotary damper gear 18.

In this way, the rotary damper gear 18 limits the maximum angular velocity of the spool 14. Limiting the angular velocity of the spool 14 protects the cartridge 10 from damage. Limiting the angular velocity of the spool 14, in cooperation with the rotary damper gear 18 pressing against the spool 14 inhibits misalignment of the spool 14 to maximize durability of the cartridge 10. Preferably the rotary damper gear 18 and the spool 14 include peripheral gear teeth which mate to further improve alignment to optimize movement of the moving components, and improve cartridge 10 reliability.

When gear teeth are used, improved tangential pressure is achieved between the spool 14, the rotary damper gear 18 and the power gear 16. The function of the gears includes maintaining alignment of the spool 14. Improved alignment of the spool 14 increases the reliability of the cartridge 10 and provides consistent sound quality to the ear buds 26.

Although the use of the power gear 16 in a rotary damper gear are disclosed here in it can be appreciated that many ways of providing power to the spool 14 can be devised. Furthermore many ways of regulating the angular velocity of the spool 14 can also be provided. For example at dampening mechanism may include a leaf spring mounted within the housing which presses on the peripheral surface of the spool 14 can create sufficient frictional force to dampen rotation of the spool 14.

Additionally a power mechanism such as a spiral power spring can be mounted on the housing with respect to the spool 14 so that the spring directly contacts the spool 14 and thereby powers the spool 14.

Furthermore, linkages such as a chain, a belt, or other mechanical transmission mechanism can be used to regulate rotation of the spool 14.

The ear bud cable 24 wraps at least partially around the spool 14. The ear bud cable 24 as a first end attached within the spool and a second and attached to ear buds 26. The ear bud cable 24 is flat to optimize alignment of the cable 24 within the spool 14 when the cable is retracted and dispensed. Utilizing a flat cable 24 minimizes the thickness of the cable to maximize the length of the cable that can be wrapped around the spool 14. The flat cable 24 minimizes entanglement of the cable 24, as compared to the use of a round cable. The flat cable 24 also eases retraction of the cable 24 by the spool 14.

The cartridge 10 utilizes the power gear 16 to selectively rotate the spool 14, or to assist in spool 14 rotation. The power gear can be externally actuated by a switch operated by a user, or by pulling the cable 24 in the way traditional window shade works. In particular, a quick pull of the cable 24 causes the power gear and the spool 14 to retract the cable 24, and a slower pull of the cable 24 enables the power gear and the spool to dispense the cable 24. The power gear 16 can be calibrated to assist in response a desired pressure applied on the cable 24.

Rotation of the power gear 16 in one direction retracts the cable 24. Counter rotation of the power gear 16 dispenses the cable 24. The power gear 16 has a periphery which presses against the periphery of the spool. Preferably the power gear 16 has peripheral gear teeth which mate with the peripheral gear teeth of the spool 14 to improve alignment and reliability of the cassette 10. The power gear 16 is spring biased to apply consistent torque to the spool 14. Applying consistent torque to the spool 14 helps to maintain a relatively constant angular velocity of the spool 14. The cooperation of the power gear 16 and the rotary dampening gear 18 assure that a constant angular velocity of the spool 14 will be achieved to improve cartridge 10 reliability.

The terms "ear bud" and "ear buds" as used herein is broadly intended and includes devices that insert into at least a portion of the pinna or ear canal a user, that at least partially cover the pinna of a user, and also devices held outside of the ear canal and pinna of a user. Accordingly, ear buds include any speaker device that hangs on the ear, inserts into the ear, or is otherwise mounted on the head of a user.

Figure 2A:
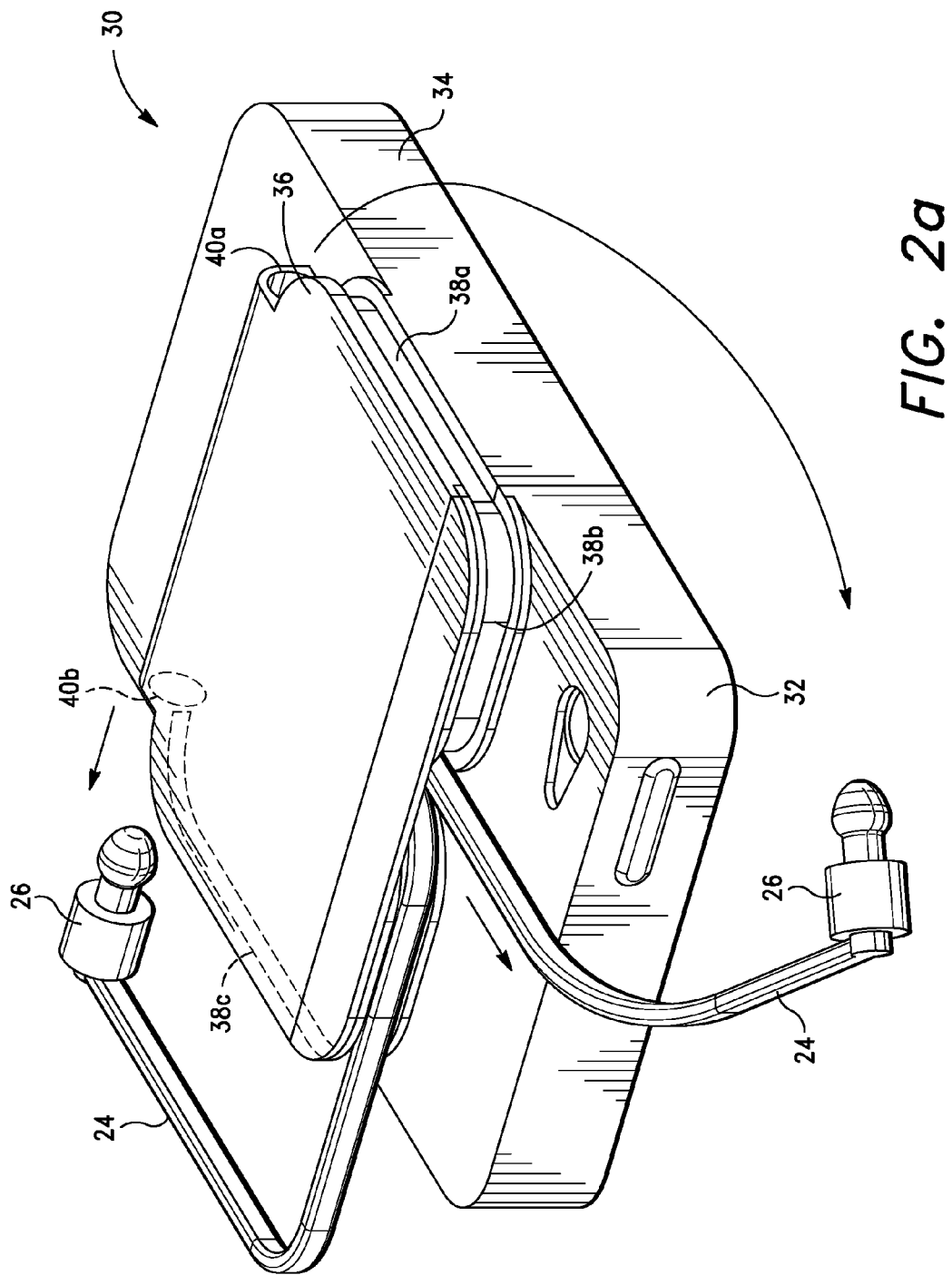
FIG. 2a shows a perspective view of a case and a cartridge.

FIG. 2a shows a case generally designated with the reference numeral 30. The case 30 includes a top cover 32, a bottom cover 34, and a pocket 36. The pocket 36 is bifurcated having a portion integrated into the bottom cover 34 and a portion integrated into the top cover 32. The pocket 36 is configured for holding and enclosing the cartridge 10 of FIG. 1.

The pocket 36 has three sides that includes peripheral grooves 38a, 38b, and 38c. The peripheral grooves 38a, 38b, and 38c are shaped to hold and press fit the ear bud cables 24. Accordingly the peripheral grooves 38a, 38b, and 38c cooperate with the cartridge 10 of FIG. 1 to retain ear Bud cables 24 in a manner which will inhibit twisting and/or tangling of the ear bud cables 24. Removing the ear buds 26 from the ear bud sockets 40a and 40b, and pulling the ear bud cables 24 from the peripheral grooves 38a, 38b and 38c, enables the ear bud cables 24 to be further pulled out of the pocket 36, and used.

Figure 2B:
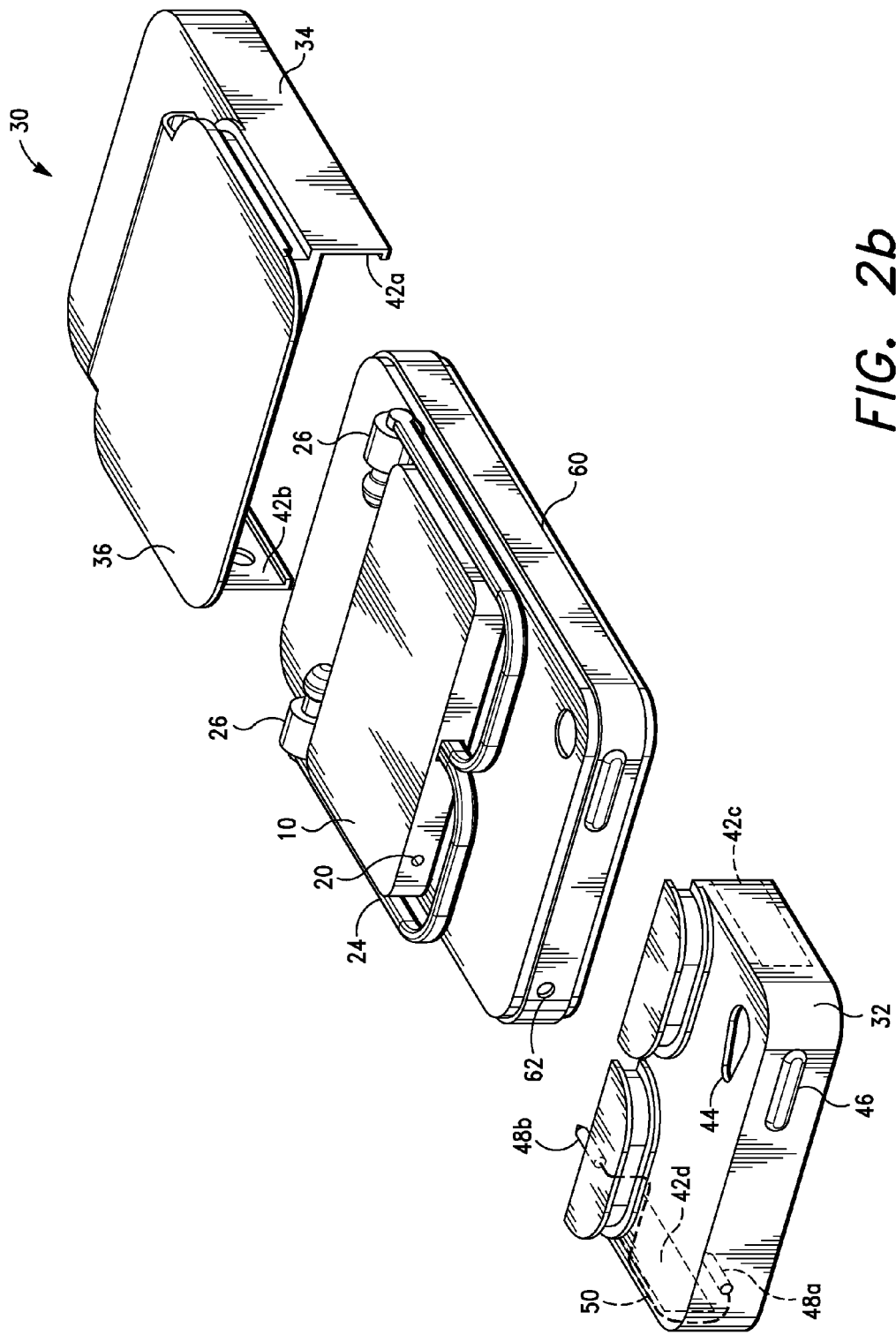
FIG. 2b shows an exploded perspective view of the case, cartridge and an audio device.

FIG. 2b shows an exploded view of the case 30, the cartridge 10 and an audio device 60. Although the audio device 60 can be any device with an audio output, preferably the audio device 60 is a telephone. In an alternate embodiment the audio device 60 is an MP3 music player. It can be appreciated that telephones and many other smart devices are capable of playing music in the MP3 format, and electronic music files of various other formats.

The bottom cover 34 includes tracks 42a and 42b, which are sized and shaped to slide over, and mount on, the audio device 60. The top cover 32 includes tracks 42c and 42d, which are sized and shaped to slide over, and mount on, the audio device 60. The bottom cover 34 in the top cover 32 thus press fit onto the audio device 60.

The top cover 32 includes a first male audio jack 48a configured to mate with female audio jack 62 of the audio device 60. The top cover 32 also includes a jumper wire 50 electronically connected to the male audio jack 48a to communicate audio signals from the audio device 60 through the case 32 the cartridge 10 and thus enable the ear buds 26 to deliver the audio signals to the ear of a user.

The top cover 32 includes a second male audio jack 48b electronically connected to the first male audio jack 48 a via the jumper wire 50. The second male audio jack 48b is configured to insert into the input jack 20 of cartridge 10.

Preferably the male audio jacks 48a and 48b are Tip-Ring-Ring-Sleeve (TRRS) connectors to enable the cartridge 10 and case 30 to cooperate to communicate stereo audio, microphone audio and control button commands between ear buds 26 and the audio device 60 via the ear bud cables 24.

The top cover 32 includes a camera opening 44 and a switch opening 46. The camera opening 44 enables the audio device 60, having camera functionality, to take pictures via the camera opening 44. The switch opening 46 enables the audio device 60, having a functional press button switch, to enable the functionality of the press button switch.

The pocket 36 has a fourth side which defines ear bud sockets 40a, and 40b. The ear bud sockets 40a, and 40b are shaped to receive and hold and a press fit the ear buds 26.

FIG. 3 shows a partially exploded view of the case 30. The top cover 32 of the case 30 includes an electrical contact pad 52 for electronically connecting the male audio jack 40 of the top cover 32 via the jumper wire 50 to the cartridge 10. The contact pad 52 includes several metallic contacts 54 capable of communicating operating signals, stereo audio signals, and a microphone signals between the cartridge 10 and the audio device 60.

The top cover 32 of the case 30 also includes mounts 63 for attaching the cartridge 10 to the top cover 32 of the case 30. When the mount 63 attached the cartridge 10 to the top cover 32 the contact pad 52 electronically connects with the ear buds 26 via the ear bud cables 24 two the cartridge 10.

The use of the contact pad the 52 eliminates the need for an audio jack connection between the top cover 32 and the cartridge 10. Further, it can be appreciated that although the case 30 electronically connects to the audio device 60 via male audio connector 48a, it can be appreciated that some audio devices 60 also include electrical contact pads that can directly connect to the electrical contact pads 52 of the case 30. It can also be appreciated that with audio devices 60 that include electrical contact pads that such electrical contact pads 52 may connect directly to hub 28 or to the spool 14 of the cartridge 10, and the case 30 would be adapted to permit this direct connection.

In an alternate embodiment the contact pad 52 electrically connects to the a contact pad of audio device 60, eliminating any need for the jumper wire 50.

While the present invention is disclosed in terms of various embodiments, including preferred embodiments, it can be appreciated that the true scope of the invention is defined only by the appended claims.

We claim:

1. A case for holding an audio device having a female audio jack, comprising:
    a cover having a first component and a second component that interconnect to hold the audio device, the first component includes a male audio jack for electronically connecting the case to the female audio jack of the audio device; and
    a cartridge attached to the cover, the cartridge has an ear bud cable and rotatable spool for selectively retracting and dispensing the ear bud cable;
    the ear bud cable has a first end with at least one ear bud, and a second end attached to the spool, the spool electronically connects with the male audio jack of the cover to enable audio communication between the audio device and the at least one ear bud;
    the first component and the second component each include tracks for slidably engaging the audio device, the tracks assure alignment of the male audio jack with the female audio jack of the audio device; and
    a pocket integrated with the case for holding the cartridge;
    the pocket defines peripheral grooves to enable ear bud cables to wrap around at least a portion of the pocket, whereby the pocket grooves and the spool of the cartridge cooperate to store ear bud cables.

2. The case as set forth in claim 1, wherein the cartridge includes two ear buds and two ear bud cables to enable stereo sound, the pocket defines three sides having peripheral grooves to enable the ear bud cables to wrap around at least a portion of the pocket, and one side including ear bud sockets for removeably retaining ear buds.

3. The case as set forth in claim 1, wherein the cartridge has two ear buds, the audio device is a telephone, and the male audio jack is a Tip-Ring-Ring -Sleeve (TRRS) connector to enable the cartridge to communicate stereo audio, microphone audio and control button commands between the ear buds and the telephone.

4. A case for holding telephone having a female audio jack, comprising:
    a removable cover having a first component and a second component that interconnect to hold the telephone, the first component includes a male audio jack for electronically connecting the cover to the female audio jack of the telephone;
    a cartridge attached to the cover, the cartridge has an ear bud cable and a rotatable spool;
    the ear bud cable has a first end with at least one ear bud, and a second end attached to the spool to enable the spool to selectively dispense and retract the ear bud cable; and
    the spool electronically connects with the male audio jack to enable audio communication between the telephone and the at least one ear bud during use;
    the case includes a pocket integrated with the case for holding the cartridge, the pocket defines peripheral grooves to enable ear bud cables to wrap around at least a portion of the pocket, whereby the pocket grooves and the cartridge cooperate to store ear bud cables.

5. The case as set forth in claim 4, wherein the cartridge includes two ear buds and two ear bud cables to enable stereo sound, the pocket defines three sides having peripheral grooves to enable the ear bud cables to wrap around at least a portion of the pocket, and one side including ear bud sockets for removeably retaining ear buds.

6. The case as set forth in claim 4, wherein the case has two ear buds and the male audio jack is a Tip-Ring-Ring-Sleeve (TRRS) connector to enable the cartridge to communicate stereo audio, microphone audio and control button commands between the ear buds and the telephone.

* * * * *